(12) United States Patent
Johnson et al.

(10) Patent No.: US 10,001,768 B2
(45) Date of Patent: Jun. 19, 2018

(54) ITEM STORAGE ARRAY FOR MOBILE BASE IN ROBOT ASSISTED ORDER-FULFILLMENT OPERATIONS

(71) Applicant: LOCUS ROBOTICS CORP., Wilmington, MA (US)

(72) Inventors: Michael Charles Johnson, Ashland, MA (US); Sean Johnson, Danvers, MA (US); Ryan Johnson, Ashland, MA (US); Luis Jaquez, Burlington, MA (US)

(73) Assignee: Locus Robotics Corp., Wilmington, MA (US)

( * ) Notice: Subject to any disclaimer, the term of this patent is extended or adjusted under 35 U.S.C. 154(b) by 89 days.

(21) Appl. No.: 15/254,321

(22) Filed: Sep. 1, 2016

(65) Prior Publication Data

US 2018/0059635 A1    Mar. 1, 2018

(51) Int. Cl.
| | | |
|---|---|---|
| *G06F 7/00* | (2006.01) | |
| *G05B 19/12* | (2006.01) | |
| *B25J 5/00* | (2006.01) | |
| *B65G 1/137* | (2006.01) | |
| *G06K 7/14* | (2006.01) | |
| *G06K 19/06* | (2006.01) | |

(Continued)

(52) U.S. Cl.
CPC ............ *G05B 19/124* (2013.01); *B25J 5/007* (2013.01); *B65G 1/1373* (2013.01); *G06K 7/1417* (2013.01); *G06K 19/06037* (2013.01); *G06Q 10/08* (2013.01); *G06Q 50/28* (2013.01); *B65G 2209/06* (2013.01); *G05B 2219/32037* (2013.01); *G05B 2219/40298* (2013.01)

(58) Field of Classification Search
None
See application file for complete search history.

(56) References Cited

U.S. PATENT DOCUMENTS 7,751,928 B1 * 7/2010 Antony ................ G06Q 10/087
                                                    700/214
8,731,708 B2    5/2014 Shakes et al.
(Continued)

FOREIGN PATENT DOCUMENTS

CN      105084020     11/2015
EP        0156953      10/1985
(Continued)

*Primary Examiner* — Yolanda R Cumbess
(74) *Attorney, Agent, or Firm* — Verrill Dana, LLP; John W. Powell

(57) ABSTRACT

A method for executing orders by at least one robot on a plurality of items stored at locations throughout a warehouse including reading a bar code affixed to an item storage array disposed on said at least one robot. The item storage array includes a plurality of interconnected containers each for storing items associated with an order. The method also includes using the read bar code to retrieve information about at least one characteristic of the item storage array and assigning an order associated to each of the plurality of containers of the item storage array. The orders are based in part on the at least one characteristic of the item storage array. The method further includes navigating the at least one robot to locations throughout the warehouse to execute the orders associated with each of the plurality of containers of the item storage array.

20 Claims, 14 Drawing Sheets

(51) Int. Cl.
*G06Q 50/28* (2012.01)
*G06Q 10/08* (2012.01)

(56) References Cited

U.S. PATENT DOCUMENTS

| | | | |
|---|---|---|---|
| 8,751,035 | B2 | 6/2014 | Janet |
| 2008/0092488 | A1* | 4/2008 | Gabrielsen .............. B65B 55/20 |
| | | | 53/428 |
| 2013/0317642 | A1 | 11/2013 | Asaria et al. |
| 2014/0350725 | A1 | 11/2014 | LaFary et al. |
| 2015/0073589 | A1 | 3/2015 | Khodl et al. |

FOREIGN PATENT DOCUMENTS

| | | |
|---|---|---|
| GB | 2 255 971 | 11/1992 |
| WO | WO2012/055410 | 5/2012 |
| WO | WO2014/025270 | 2/2014 |

* cited by examiner

| Fiducial ID | x | y | z | quaternion.x | quaternion.y | quaternion.z | quaternion.w |
|---|---|---|---|---|---|---|---|
| 1 | -10.2 | 2.3 | 0 | 0 | 0 | 0 | 1 |
| 2 | 23.1 | 15.8 | 0 | 0 | 0 | 0 | 1 |
| 3 | 45.3 | 3.3 | 0 | 0 | 0 | -1 | 0 |

| Location | Fiducial ID |
|---|---|
| L01001A | 11 |
| L01001B | 11 |
| L01001C | 11 |
| L01001D | 11 |
| L01001E | 11 |
| L01001F | 11 |
| L01002A | 12 |
| L01002B | 12 |
| L01002C | 12 |
| L01002D | 12 |
| L01002E | 12 |
| L01003A | 13 |
| L01003B | 13 |
| L01003C | 13 |
| L01003D | 13 |
| L01003E | 13 |
| L01003F | 13 |
| L01004A | 14 |
| L01004B | 14 |
| L01004C | 14 |
| L01004D | 14 |
| L01004E | 14 |
| L01005A | 15 |
| L01005B | 15 |
| L01005C | 15 |
| L01005D | 15 |
| L01005E | 15 |
| L01005F | 15 |

| Array Code | Number of Components | Comp. ID | Comp. Color | Comp. Size |
|---|---|---|---|---|
| 001 | 3 | T81001<br>T81002<br>T81003 | Blue<br>Yellow<br>Green | A x B x C |
| ⋮ | ⋮ | ⋮ | ⋮ | ⋮ |

662 — (Array Code row)
664 — Number of Components
666 — Comp. ID
668 — Comp. Color
670 — Comp. Size

Fig. 12

ITEM STORAGE ARRAY FOR MOBILE BASE IN ROBOT ASSISTED ORDER-FULFILLMENT OPERATIONS

FIELD OF INVENTION

This invention relates to robot-assisted product order-fulfillment systems and methods and more particularly an item storage array disposed on a robot mobile base for handling multiple orders.

BACKGROUND

Ordering products over the internet for home delivery is an extremely popular way of shopping. Fulfilling such orders in a timely, accurate and efficient manner is logistically challenging to say the least. Clicking the "check out" button in a virtual shopping cart creates an "order." The order includes a listing of items that are to be shipped to a particular address. The process of "fulfillment" involves physically taking or "picking" these items from a large warehouse, packing them, and shipping them to the designated address. An important goal of the order-fulfillment process is thus to ship as many items in as short a time as possible.

The order-fulfillment process typically takes place in a large warehouse that contains many products, including those listed in the order. Among the tasks of order fulfillment is therefore that of traversing the warehouse to find and collect the various items listed in an order. In addition, the products that will ultimately be shipped first need to be received in the warehouse and stored or "placed" in storage bins in an orderly fashion throughout the warehouse so they can be readily retrieved for shipping.

In a large warehouse, the goods that are being delivered and ordered can be stored in the warehouse very far apart from each other and dispersed among a great number of other goods. With an order-fulfillment process using only human operators to place and pick the goods requires the operators to do a great deal of walking and can be inefficient and time consuming. Since the efficiency of the fulfillment process is a function of the number of items shipped per unit time, increasing time reduces efficiency.

Robot assisted order-fulfillment systems have been used to increase efficiency and productivity. In some systems, a plurality of individual receptacles have been placed on a mobile robot base in order for the robot base to execute multiple orders. Such a system is described in U.S. Patent Application Publication No. 2015/0073589. There are, however, inefficiencies with these system and improvements are needed to further increase efficiency and throughput of such robot assisted order-fulfillment systems.

SUMMARY

In one aspect the invention features a method for executing orders by at least one robot on a plurality of items stored at locations throughout a warehouse. The method comprises reading a barcode affixed to an item storage array disposed on the at least one robot, the item storage array including a plurality of interconnected containers each for storing items associated with an order. The method also includes using the read barcode to retrieve information about at least one characteristic of the item storage array and assigning an order associated to each of the plurality of containers of the item storage array. The orders are based in part on the at least one characteristic of the item storage array. The method also includes navigating the at least one robot to locations throughout the warehouse to execute the orders associated with each of the plurality of containers of the item storage array.

In other aspects of the invention, one or more of the following features may be included. The barcode affixed to an item storage array may be associated with the item storage array per se rather than the individual containers and wherein the item storage array may further include a barcode associated with each of the individual containers in the item storage array. The item storage array may be disposed on a surface of the at least one robot. The item storage array may be attached to an armature affixed to the at least one robot and the item storage array may be located above a surface of the at least one robot. The step of using the read barcode to retrieve information about at least one characteristic of the item storage array may include correlating the read barcode to an item storage array identification stored in a table and obtaining a plurality of characteristics about the item storage array. The plurality of characteristics of the item storage array may include one or more of a number of containers, the container identification numbers, the colors of the containers, and the dimensions of the containers. The step of assigning an order may include using the number of containers in the item storage array to obtain from an order queue a corresponding number of orders and associating each of the obtained orders to a container. The step of associating each of the obtained orders to a container may further include using an additional characteristic of the item storage array to associate each of the orders to a container. The additional characteristic of the item storage array used to associate each of the orders to a container may be the dimensions of the containers. The step of navigating may include displaying by the at least one robot for an operator at the locations in the warehouse at least one of the container identification number and the container color to inform the operator the container in the item storage array associated with the execution of each order.

In another aspect the invention features a robot for executing orders on a plurality of items stored at locations throughout a warehouse. The robot includes a mobile base and an item storage array disposed on the mobile base. The item storage array includes a plurality of interconnected compartments each for storing items associated with an order and the item storage array includes a barcode which is correlated to information stored in a management server about at least one characteristic of the item storage array. There is a processor configured to receive an order from the management server associated with each of the plurality of compartments of the item storage array. The orders are based in part on the at least one characteristic of the item storage array. The processor is also configured to navigate the at least one robot to locations throughout the warehouse and execute the orders associated with each of the plurality of compartments of the item storage array.

In yet other aspects of the invention, one or more of the following features may be included. The barcode affixed to an item storage array may be associated with the item storage array per se rather than the individual containers and the item storage array may further include a barcode associated with each of the individual containers in the item storage array. The item storage array may be disposed on a surface of the at least one robot. The item storage array may be attached to an armature affixed to the at least one robot and the item storage array may be located above a surface of the at least one robot. The processor may be configured to correlate the read barcode to an item storage array identification stored in a table and obtain a plurality of characteristics about the item storage array. The plurality of characteristics of the item storage array may include one or more of a number of containers, the container identification numbers, the colors of the containers, and the dimensions of the containers. The number of containers in the item storage array may be used to obtain from an order queue a corresponding number of orders and associating each of the obtained orders to a container. Wherein associating each of the obtained orders to a container may further include using an additional characteristic of the item storage array to associate each of the orders to a container. The additional characteristic of the item storage array used to associate each of the orders to a container may be the dimensions of the containers. The robot may further include a display and the processor is further configured to provide an image on the display for an operator at the locations in the warehouse at least one of the container identification number and the container color to inform the operator the container in the item storage array associated with the execution of each order.

These and other features of the invention will be apparent from the following detailed description and the accompanying figures, in which:

BRIEF DESCRIPTION OF THE FIGURES

FIG. 6 is a table of the fiducial identification to pose mapping;

FIG. 7 is a table of the bin location to fiducial identification mapping;

FIG. 12 is a table of data regarding the characteristics of the storage arrays used according to this invention.

DETAILED DESCRIPTION

Figure 1:
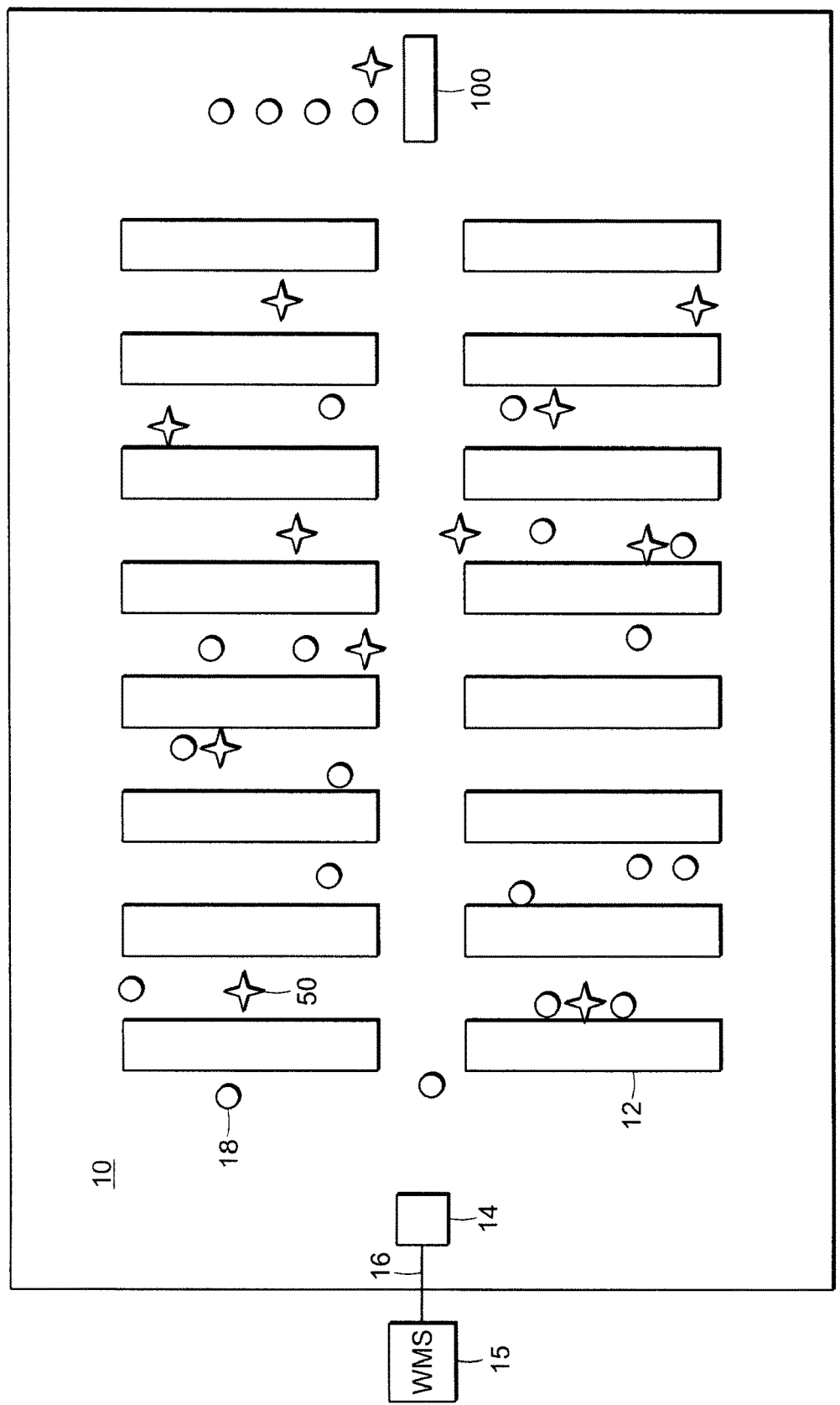
FIG. 1 is a top plan view of an order-fulfillment warehouse.

Referring to FIG. 1, a typical order-fulfillment warehouse 10 includes shelves 12 filled with the various items that could be included in an order 16. In operation, the order 16 from warehouse management server 15 arrives at an order-server 14. The order-server 14 communicates an order assignment to a robot 18 selected from a plurality of robots that roam the warehouse 10.

Figure 2:
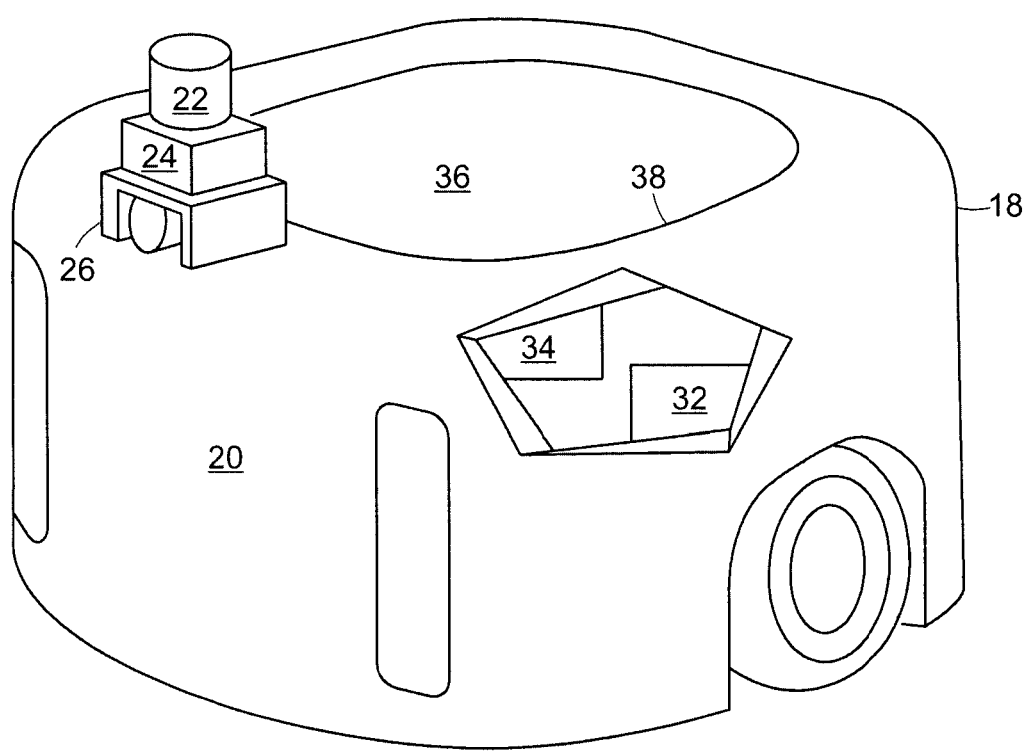
FIG. 2 is a perspective view of a base of one of the robots used in the warehouse shown in FIG. 1.
Figure 3:
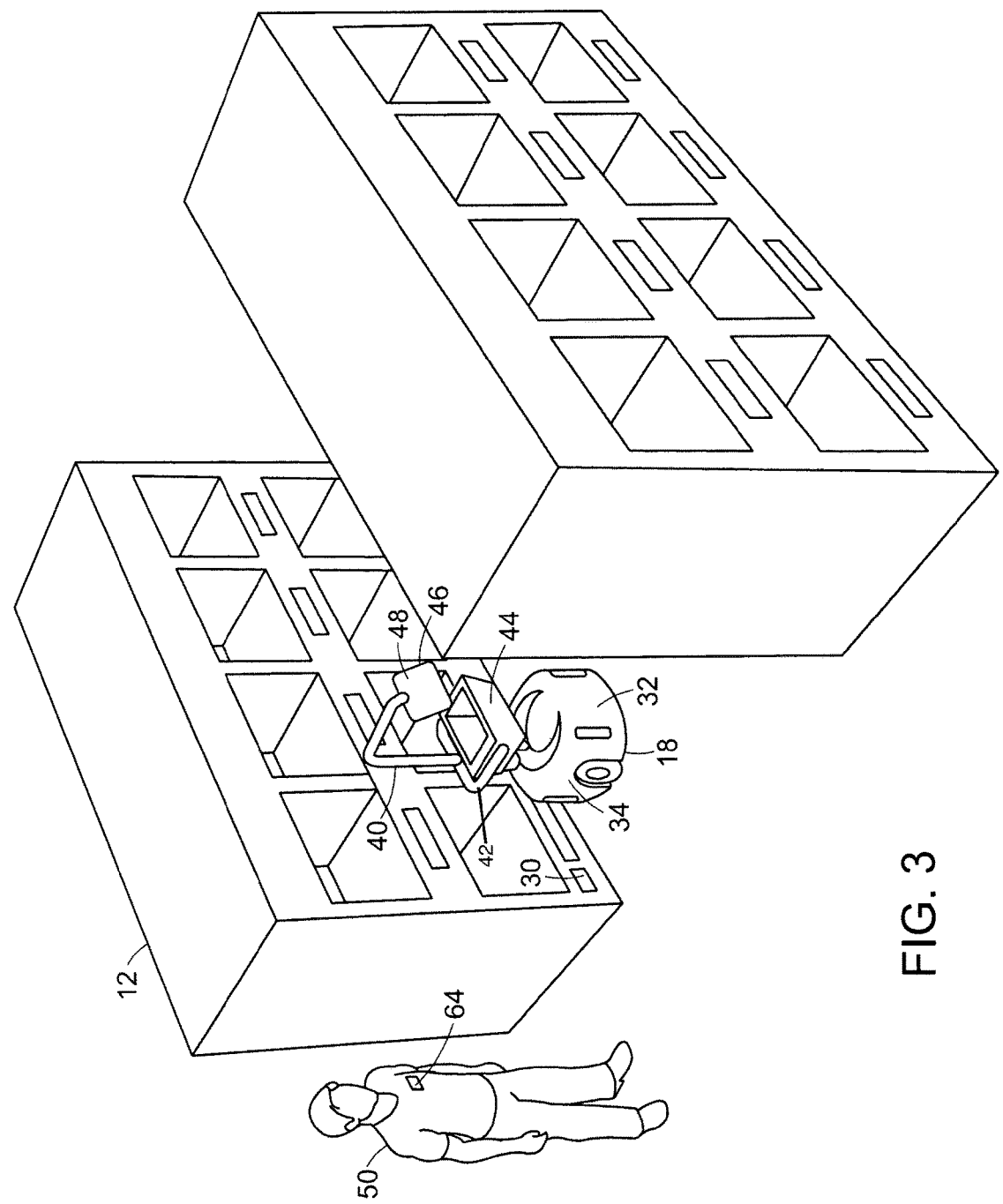
FIG. 3 is a perspective view of the robot in FIG. 2 outfitted with an armature and parked in front of a shelf shown in FIG. 1.

In a preferred embodiment, a robot 18, shown in FIG. 2, includes an autonomous wheeled base 20 having a laser-radar 22. The base 20 also features a transceiver 24 that enables the robot 18 to receive instructions from the order-server 14, and a camera 26. The base 20 also features a processor 32 that receives data from the laser-radar 22 and the camera 26 to capture information representative of the robot's environment and a memory 34 that cooperate to carry out various tasks associated with navigation within the warehouse 10, as well as to navigate to fiducial marker 30 placed on shelves 12, as shown in FIG. 3. Fiducial marker 30 (e.g. a two-dimensional barcode) corresponds to bin/location of an item ordered. The navigation approach of this invention is described in detail below with respect to FIGS. 4-8.

While the initial description provided herein is focused on picking items from bin locations in the warehouse to fulfill an order for shipment to a customer, the system is equally applicable to the storage or placing of items received into the warehouse in bin locations throughout the warehouse for later retrieval and shipment to a customer. The invention is also applicable to inventory control tasks associated with such a warehouse system, such as, consolidation, counting, verification, inspection and clean-up of products.

Robots 18, while executing a single order assignment traveling throughout the warehouse 10, may be picking items, placing items, and performing inventory control tasks. This kind of interleaved task approach can significantly improve efficiency and performance.

Referring again to FIG. 2, An upper surface 36 of the base 20 features a coupling 38 that engages any one of a plurality of interchangeable armatures 40, one of which is shown in FIG. 3. The particular armature 40 in FIG. 3 features a tote-holder 42 for carrying a tote 44 that receives items, and a tablet holder 46 for supporting a tablet 48. In some embodiments, the armature 40 supports one or more totes for carrying items.

In other embodiments, the base 20 supports one or more totes for carrying received items. As used herein, the term "tote" or "container" includes, without limitation, cargo holders, bins, cages, shelves, rods from which items can be hung, caddies, crates, racks, stands, trestle, boxes, canisters, vessels, and repositories. There may also be used a storage array having an array of two or more totes or containers which are affixed to one another or a single unit having multiple compartments. Each of the totes/containers or compartments may be associated with a separate order or multiple totes/containers/compartments may be used for and associated with a single larger order. Specific embodiments of the storage array will be described below with regard to FIGS. 9-13. The description of the operation of the robot 18 with a single tote, described in FIGS. 1-8, is also applicable to the storage array of FIGS. 9-13.

Although a robot 18 excels at moving around the warehouse 10, with current robot technology, it is not very good at quickly and efficiently picking items from a shelf and placing them on the tote 44 due to the technical difficulties associated with robotic manipulation of objects. A more efficient way of picking items is to use a local operator 50, which is typically human, to carry out the task of physically removing an ordered item from a shelf 12 and placing it on robot 18, for example, in tote 44. The robot 18 communicates the order assignment to the local operator 50 via the tablet 48, which the local operator 50 can read, or by transmitting the order assignment to a handheld device used by the local operator 50.

Upon receiving the order assignment from the order server 14, the robot 18 proceeds to a first warehouse location, e.g. shown in FIG. 3. It does so based on navigation software stored in the memory 34 and carried out by the processor 32. The navigation software relies on data concerning the environment, as collected by the laser-radar 22, an internal table in memory 34 that identifies the fiducial identification ("ID") of fiducial marker 30 that corresponds to a location in the warehouse 10 where a particular item can be found, and the camera 26 to navigate.

Upon reaching the correct location, the robot 18 parks itself in front of a shelf 12 on which the item is stored and waits for a local operator 50 to retrieve the item from the shelf 12 and place it in tote 44. If robot 18 has other items to retrieve it proceeds to those locations. The item(s) retrieved by robot 18 are then delivered to a packing station 100, FIG. 1, where they are packed and shipped.

It will be understood by those skilled in the art that each robot may be fulfilling one or more order assignments and each order assignment may consist of one or more items. Typically, some form of route optimization software would be included to increase efficiency, but this is beyond the scope of this invention and is therefore not described herein.

In order to simplify the description of the invention, a single robot 18 and operator 50 are described. However, as is evident from FIG. 1, a typical fulfillment operation includes many robots and operators working among each other in the warehouse to fill a continuous stream of orders.

The navigation approach of this invention, as well as the semantic mapping of a SKU of an item to be retrieved to a fiducial ID/pose associated with a fiducial marker in the warehouse where the item is located, is described in detail below with respect to FIGS. 4-8.

Using one or more robots 18, a map of the warehouse 10 must be created and the location of various fiducial markers dispersed throughout the warehouse must be determined. To do this, one of the robots 18 navigates the warehouse and builds a map 10a, FIG. 4, utilizing its laser-radar 22 and simultaneous localization and mapping (SLAM), which is a computational problem of constructing or updating a map of an unknown environment. Popular SLAM approximate solution methods include the particle filter and extended Kalman filter. The SLAM GMapping approach is the preferred approach, but any suitable SLAM approach can be used.

Robot 18 utilizes its laser-radar 22 to create map 10a of warehouse 10 as robot 18 travels throughout the space identifying, open space 112, walls 114, objects 116, and other static obstacles, such as shelf 12, in the space, based on the reflections it receives as the laser-radar scans the environment.

Figure 4:
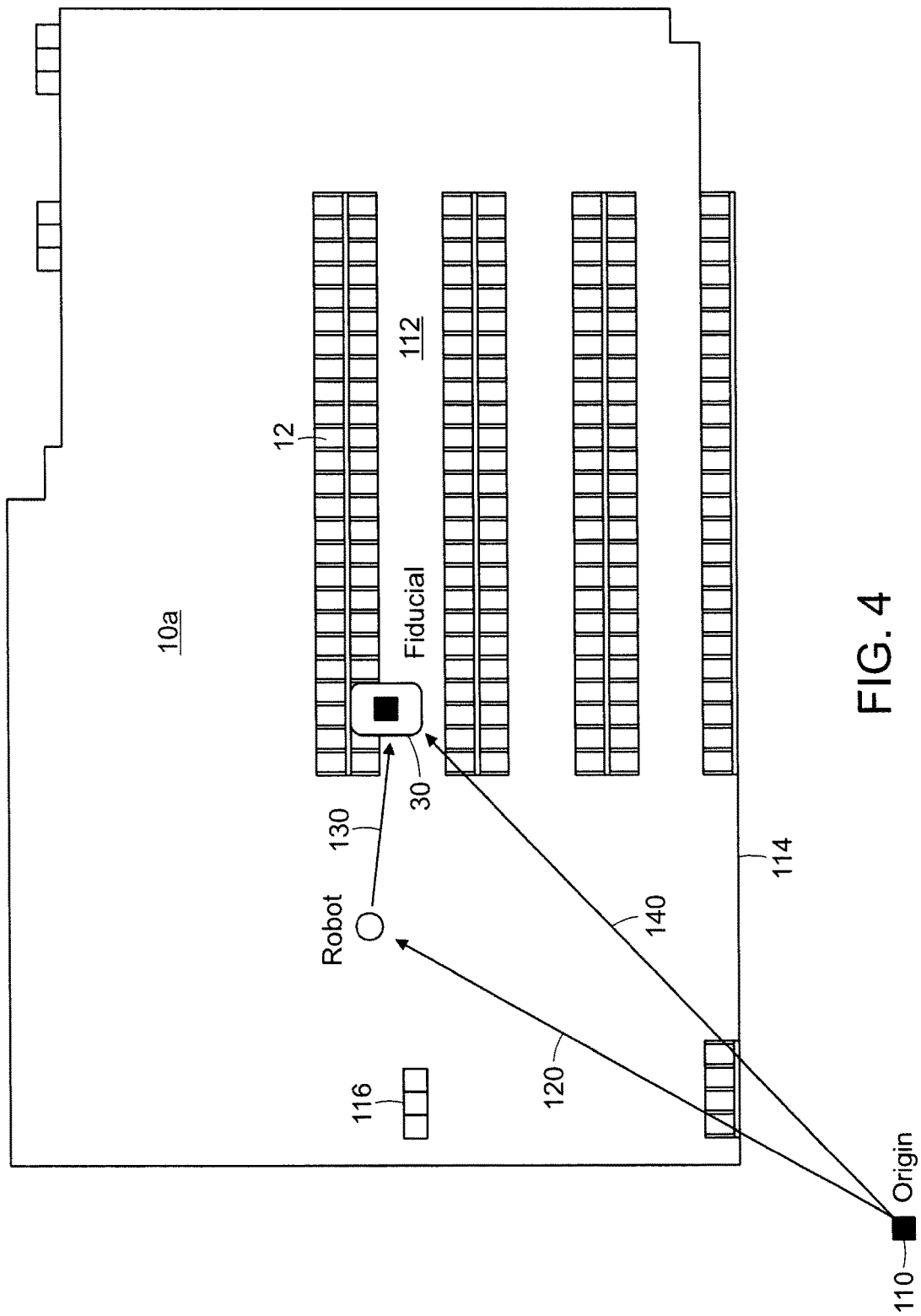
FIG. 4 is a partial map of the warehouse of FIG. 1 created using laser radar on the robot.

While constructing the map 10a or thereafter, one or more robots 18 navigates through warehouse 10 using camera 26 to scan the environment to locate fiducial markers (two-dimensional barcodes) dispersed throughout the warehouse on shelves proximate bins, such as 32 and 34, FIG. 3, in which items are stored. Robots 18 use a known starting point or origin for reference, such as origin 110. When a fiducial marker, such as fiducial marker 30, FIGS. 3 and 4, is located by robot 18 using its camera 26, the location in the warehouse relative to origin 110 is determined.

By the use of wheel encoders and heading sensors, vector 120, and the robot's position in the warehouse 10 can be determined. Using the captured image of a fiducial marker/ two-dimensional barcode and its known size, robot 18 can determine the orientation with respect to and distance from the robot of the fiducial marker/two-dimensional barcode, vector 130. With vectors 120 and 130 known, vector 140, between origin 110 and fiducial marker 30, can be determined. From vector 140 and the determined orientation of the fiducial marker/two-dimensional barcode relative to robot 18, the pose (position and orientation) defined by a quaternion (x, y, z, w) for fiducial marker 30 can be determined.

Figure 5:
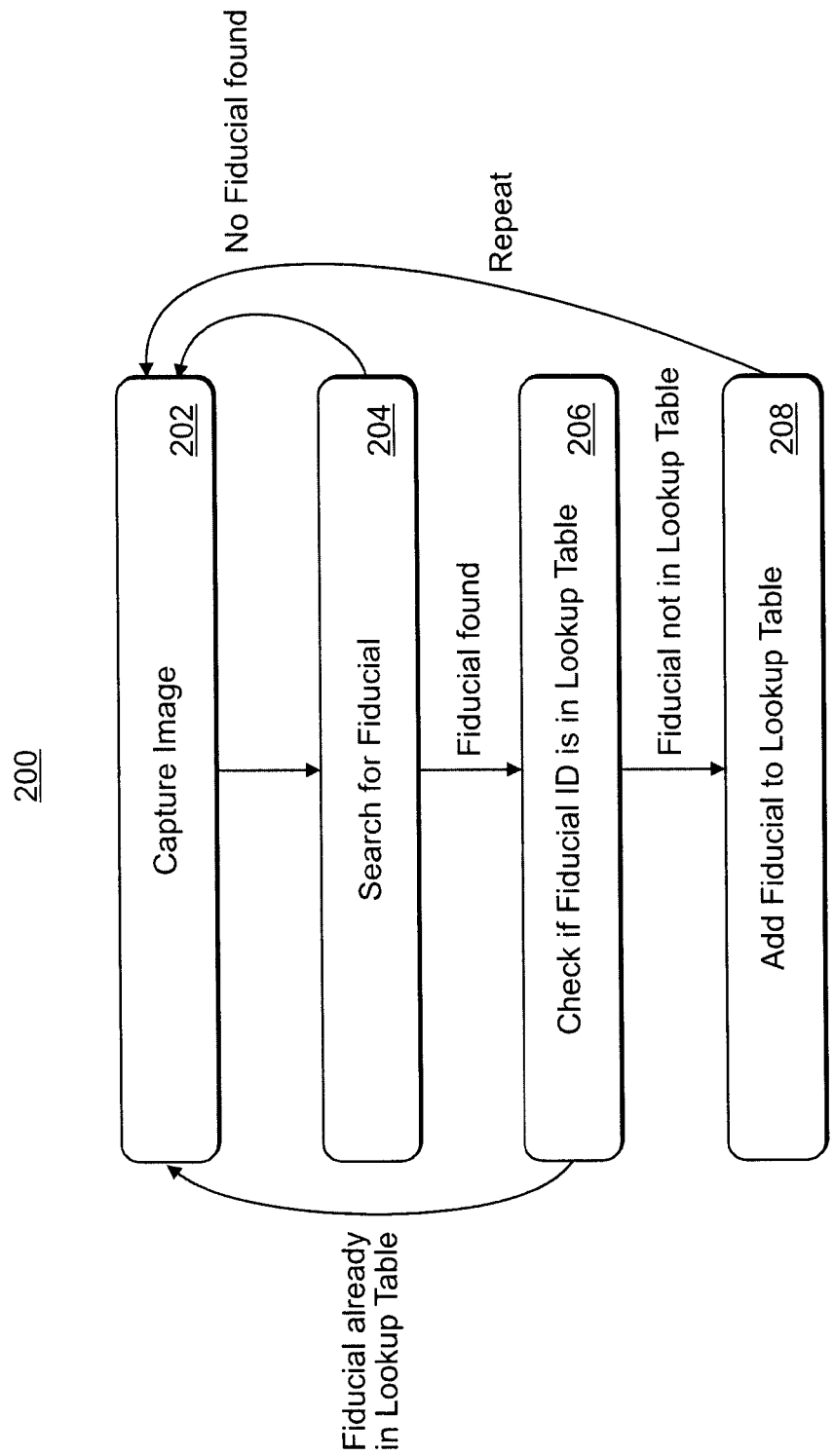
FIG. 5 is a flow chart depicting the process for locating fiducial markers dispersed throughout the warehouse and storing fiducial marker poses.

Flow chart 200, FIG. 5, describing the fiducial marker location process is described. This is performed in an initial mapping mode and as robot 18 encounters new fiducial markers in the warehouse while performing picking, placing and/or other tasks. In step 202, robot 18 using camera 26 captures an image and in step 204 searches for fiducial markers within the captured images. In step 206, if a fiducial marker is found in the image (step 204) it is determined if the fiducial marker is already stored in fiducial table 300, FIG. 6, which is located in memory 34 of robot 18. If the fiducial information is stored in memory already, the flow chart returns to step 202 to capture another image. If it is not in memory, the pose is determined according to the process described above and in step 208, it is added to fiducial to pose lookup table 300.

In look-up table 300, which may be stored in the memory of each robot, there are included for each fiducial marker a fiducial identification, 1, 2, 3, etc, and a pose for the fiducial marker/barcode associated with each fiducial identification. The pose consists of the x, y, z coordinates in the warehouse along with the orientation or the quaternion (x, y, z, w).

In another look-up Table 400, FIG. 7, which may also be stored in the memory of each robot, is a listing of bin locations (e.g. 402a-f) within warehouse 10, which are correlated to particular fiducial ID's 404, e.g. number "11". The bin locations, in this example, consist of seven alpha-numeric characters. The first six characters (e.g. L01001) pertain to the shelf location within the warehouse and the last character (e.g. A-F) identifies the particular bin at the shelf location. In this example, there are six different bin locations associated with fiducial ID "11". There may be one or more bins associated with each fiducial ID/marker.

The alpha-numeric bin locations are understandable to humans, e.g. operator 50, FIG. 3, as corresponding to a physical location in the warehouse 10 where items are stored. However, they do not have meaning to robot 18. By mapping the locations to fiducial ID's, Robot 18 can determine the pose of the fiducial ID using the information in table 300, FIG. 6, and then navigate to the pose as described herein.

Figure 8:
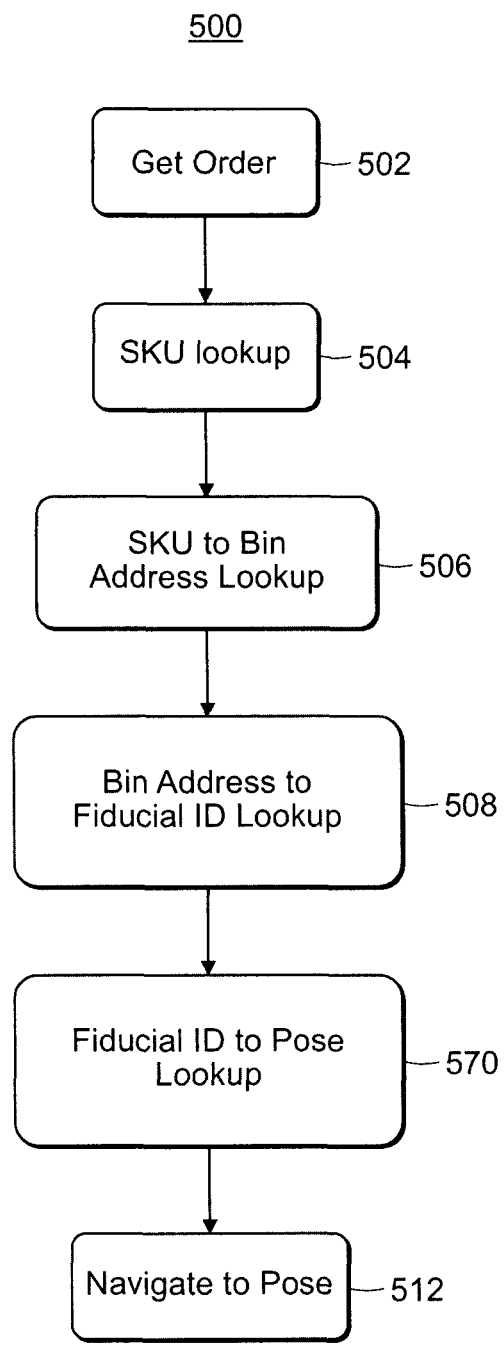
FIG. 8 is a flow chart depicting product SKU to pose mapping process.

The order fulfillment process according to this invention is depicted in flow chart 500, FIG. 8. In step 502, warehouse management system 15, FIG. 1, obtains an order, which may consist of one or more items to be retrieved. In step 504 the SKU number(s) of the items is/are determined by the warehouse management system 15, and from the SKU number(s), the bin location(s) is/are determined in step 506. A list of bin locations for the order is then transmitted to robot 18. In step 508, robot 18 correlates the bin locations to fiducial ID's and from the fiducial ID's, the pose of each fiducial ID is obtained in step 510. In step 512 the robot 18 navigates to the pose as shown in FIG. 3, where an operator can pick the item to be retrieved from the appropriate bin and place it on the robot.

Item specific information, such as SKU number and bin location, obtained by the warehouse management system 15, can be transmitted to tablet 48 on robot 18 so that the operator 50 can be informed of the particular items to be retrieved when the robot arrives at each fiducial marker location.

With the SLAM map and the pose of the fiducial ID's known, robot 18 can readily navigate to any one of the fiducial ID's using various robot navigation techniques. The preferred approach involves setting an initial route to the fiducial marker pose given the knowledge of the open space 112 in the warehouse 10 and the walls 114, shelves (such as shelf 12) and other obstacles 116. As the robot begins to traverse the warehouse using its laser radar 26, it determines if there are any obstacles in its path either fixed or dynamic, such as other robots 18 and/or operators 50 and iteratively updates its path to the pose of the fiducial marker. The robot re-plans its route about once every 50 milliseconds, constantly searching for the most efficient and effective path while avoiding obstacles.

As described above, a storage array having two or more totes or containers which are affixed to one another or a single unit having multiple compartments may be used to increase efficiency. The terms totes, containers, and compartments (among other terms described above) may be used interchangeably herein. One embodiment of the storage array according to this invention is described with regard to FIG. 9A. Robot 18a is shown to include an upper surface 36a of a wheeled base 20a. There is an armature 40a which at a first end is connected to wheeled base 20a (connection not visible in this view) and at its other end it connects to tablet holder 46a for supporting a tablet 48a. Unlike armature 40, FIG. 3, armature 40a does not include a tote-holder 42 for carrying a tote 44 that receives items. Instead, the storage array 44a is placed on upper surface 36a of wheeled base 20a.

In this embodiment, storage array 44a includes three storage containers 602, 604, and 606, which are vertically stacked upon each other and are fixedly interconnected to form an integrated array. Each container 602, 604, and 606 in storage array 44a includes a barcode disposed on barcode labels 612, 614, and 616, respectively. Also on each barcode label is a number associated with each container, which may be read by a human operator, such as operator 50a, FIG. 10, to identify the different containers. The numbers in this example are "T81001", "T81002", and "T81003" associated with containers 602, 604, and 606, respectively. In order to make it easier to distinguish among the containers, they may be colored differently. For example, container 602, may be colored blue in whole or in part. Container 604, may be colored yellow in whole or in part and container 606, may be colored green in whole or in part.

In addition, there is included a barcode label 620, which is associated with the storage array 44a. The barcode label 620 also includes a storage array identification number, in this case "001", for the operator 50a to identify it among the various storage arrays. Barcode label 620 is positioned on a side of container 602, but this label could be positioned in various locations on the storage array.

Figure 9A:
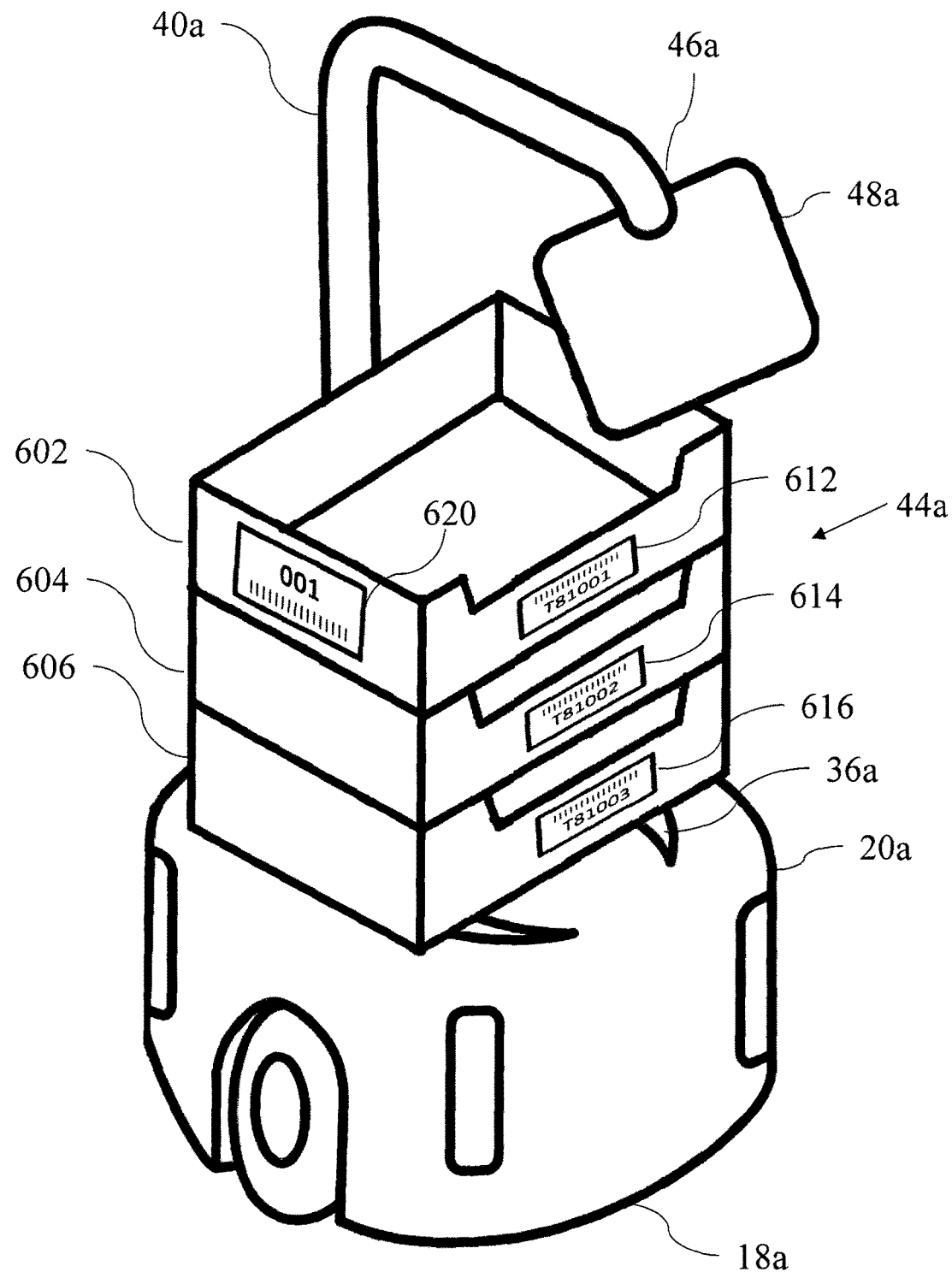
FIG. 9A is a perspective view of the robot in FIG. 3 outfitted with an armature and a storage array according to the invention.
Figure 9B:
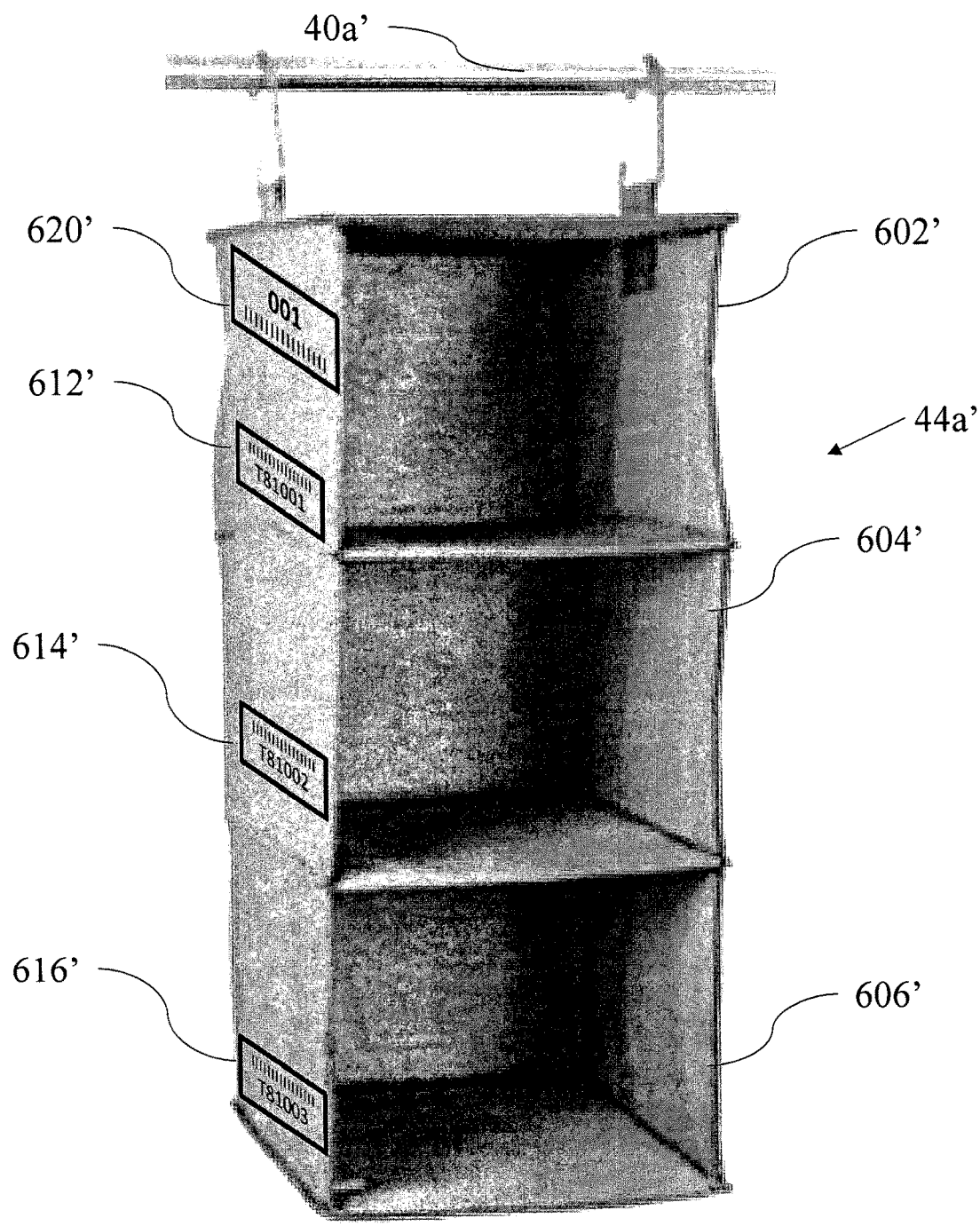
FIG. 9B is a perspective view of another embodiment of a storage array according to the invention.

Alternatively, a holder may be included on the armature 40a to support storage array 44a. It should be noted that any other storage array configurations, including one hanging from the armature above surface 36a of robot 18a could be used, such as storage array 44a' as depicted in FIG. 9B. Components of FIG. 9B which are comparable to those in FIG. 9A are show with a prime (') symbol. In both cases, the storage array is removable so that various types of storage arrays can be used with all of the robots 18a being utilized in a warehouse.

An operator may initiate a "pick" process with a robot by inducting it into the system and providing notification to order server 14 that robot 18a is available to receive and execute an order assignment. In the induction process, the operator may interact with the robot 18a via a touch screen on the tablet 48a of the robot or via a handheld wireless device to activate it. The robot then communicates to order server 14 that it is ready to receive its order assignment. The operator also provides robot 18a with a storage array, such as storage array 44a.

Rather than inducting each container 602, 604, and 606 individually and obtaining an order assignment for each serially by scanning the barcode labels 612, 614, and 616 for each container, the operator may scan only barcode label 620, associated with storage array 44a, in order to efficiently generate the orders order assignments for all three individual containers. This process is described with respect to flow chart 650, FIG. 11.

The process of flow chart 650 begins when an operator scans a barcode of an item storage array at step 652, in this example it is barcode label 620 which has an identification number 001. The identification is transmitted to the order server 14 which then obtains one or more characteristics of the particular storage array which will be used to assign the order(s).

A table 660, FIG. 12, is stored in WMS 15 and contains the characteristics of item storage array 44a shown at array identification 662, as well as the characteristics of all of the item storage arrays available for use in the warehouse. The characteristics may include, for example, the number of compartments in the storage array, the compartment ID numbers, the compartment colors, and the compartment size. For item storage array 44a, the number of compartments, i.e. 3, is found at location 664 in table 660 and the compartment ID numbers "T81001", "T81002", and "T81003" associated with containers 602, 604, and 606, respectively, are found at location 666. The compartment colors (e.g. blue, yellow and green) may be found at location 668 and the compartment size (e.g. dimensions Ain.×Bin.× Cin.) may be found at location 670. Rather than storing the actual dimensions a code indicative of the size of the compartments may be stored. All of the compartments of a particular storage array may have the same size or they may be sized differently.

Figure 11:
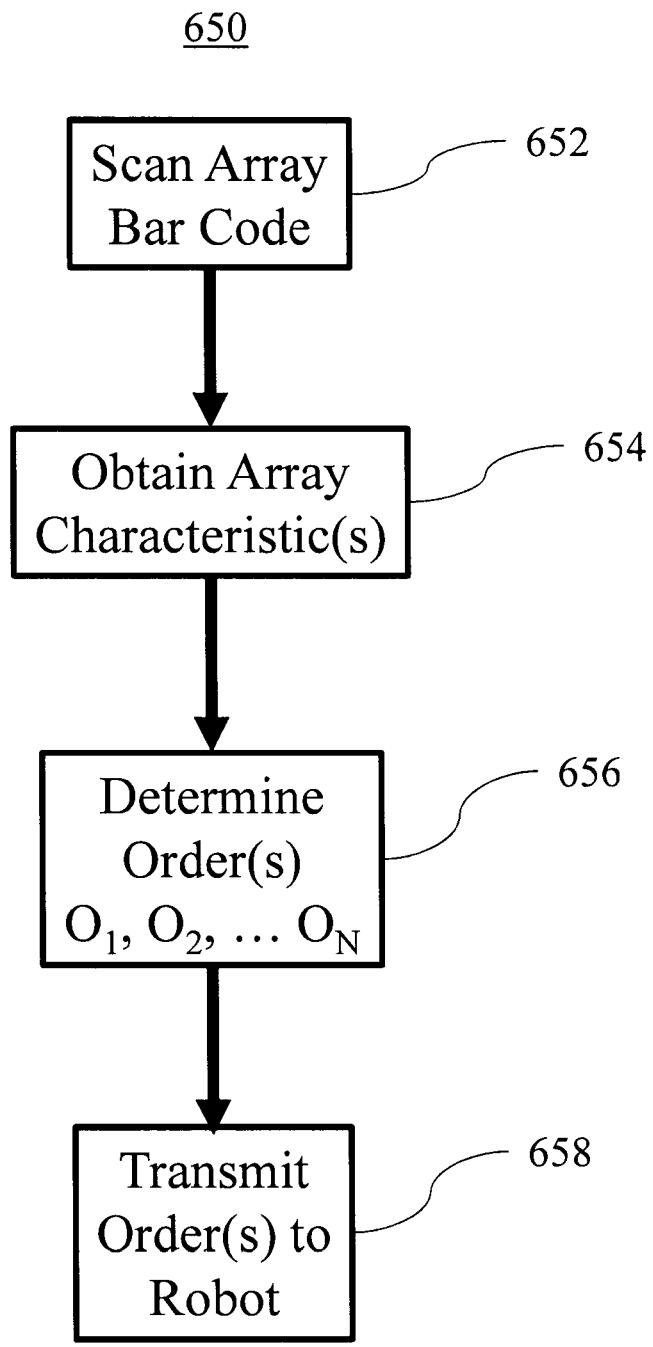
FIG. 11 is a flow chart depicting the robot induction process according to the invention for a robot carrying a storage array.

Referring again to flow chart 650, FIG. 11, at step 656 using at least one characteristic of the storage array, the orders, $O_1, O_2, \ldots O_N$, are determined and at step 658, the order assignments are transmitted to robot 18a. In the simplest implementation, the characteristic used to determine the order assignments may be only the number of containers in the array. With storage array 44a, the order server 14 will know from table 660, FIG. 12, that there are three containers and it may then select the next three orders, $O_1$, $O_2$, and $O_3$, from a "pick" queue (i.e. a queue of pick orders assigned priority by the WMS 15 based on certain predetermined criteria) and assign them to compartments T81001, T81002, and T81003 associated with containers 602, 604, and 606, respectively. Also, transmitted (or previously stored) would be the color coding and the ID numbers associated with each container/compartment. The orders to be assigned may also be aggregated based on the location of the items in the warehouse, or by using other criteria, which means that they may be picked in a different order than sequentially from the queue.

Of course, other characteristics could be used along with the number of containers to assign orders. For example, compartment size could be used as well to pair the size of items in an order with the size of the containers available. In this case, the orders may not be selected sequentially from the "pick" queue, but may be picked out of order to better match items to the compartments based on size. Table 660 in FIG. 12 is shown to have a curved line adjacent to the column for container size to indicate that additional columns, describing additional characteristics of the storage arrays, may be included.

Once robot 18a has received its order assignments for storage array it navigates to a location in the warehouse to begin execution of its assigned pick orders. Robot 18a may use a route optimization approach to determine the order of the picks from the three order assignments received. This may result in picks for different order assignments interleaved between stops rather than sequentially picking for $O_1$, then $O_2$ and finally $O_3$. For the items to be picked, the order assignment from the order server 14 will include the product SKU. As described above, from the SKU, the robot 18a determines the bin number/location, such as location 630, FIG. 10, where the product is located in the warehouse. Robot 18a then correlates the bin location to a fiducial ID (see FIG. 7) and from the fiducial ID, the pose associated with the product SKU is determined and the robot navigates to the pose.

Figure 10:
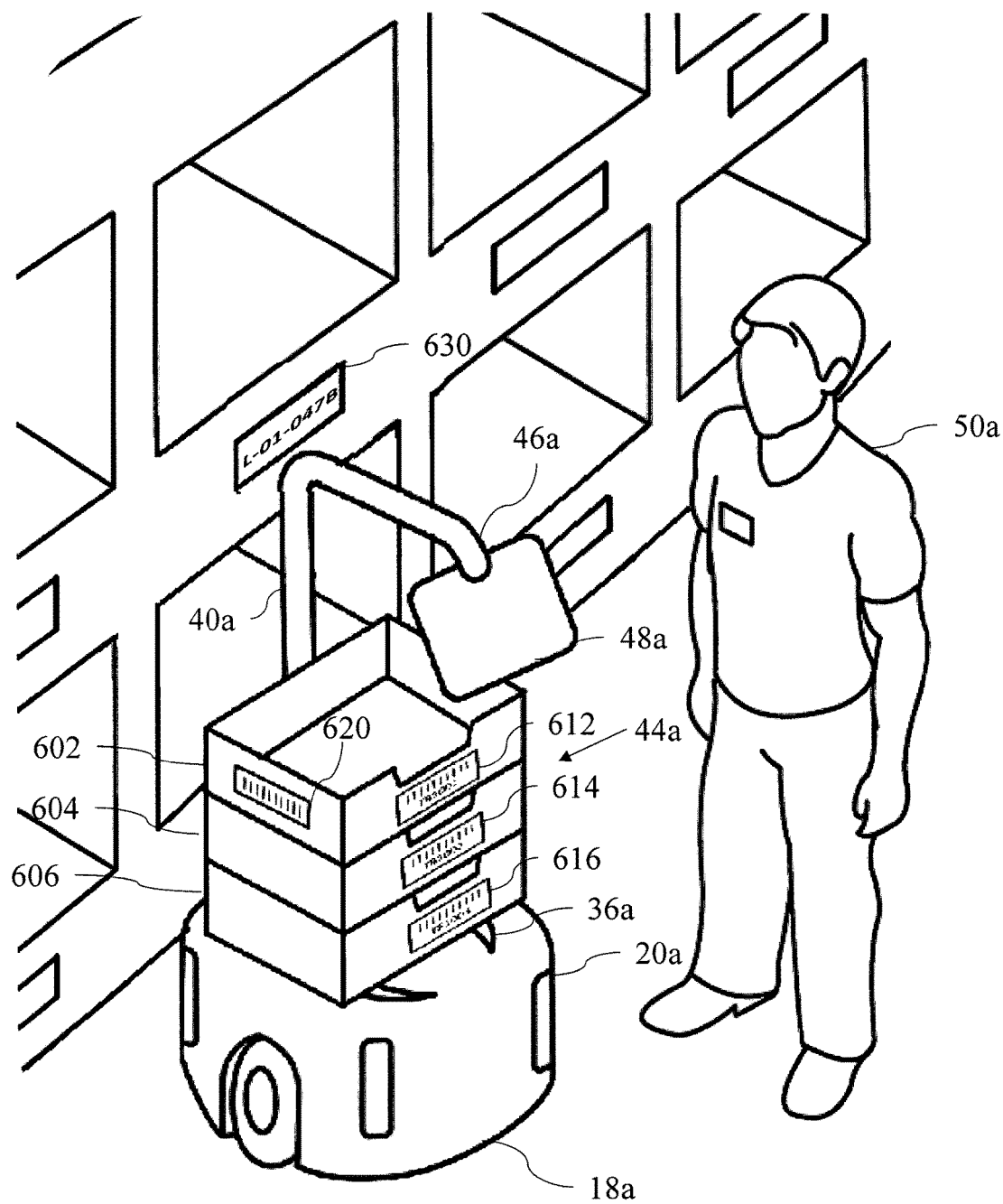
FIG. 10 is a perspective view of the robot and storage array of FIG. 9A parked in front of a shelf.
Figure 13:
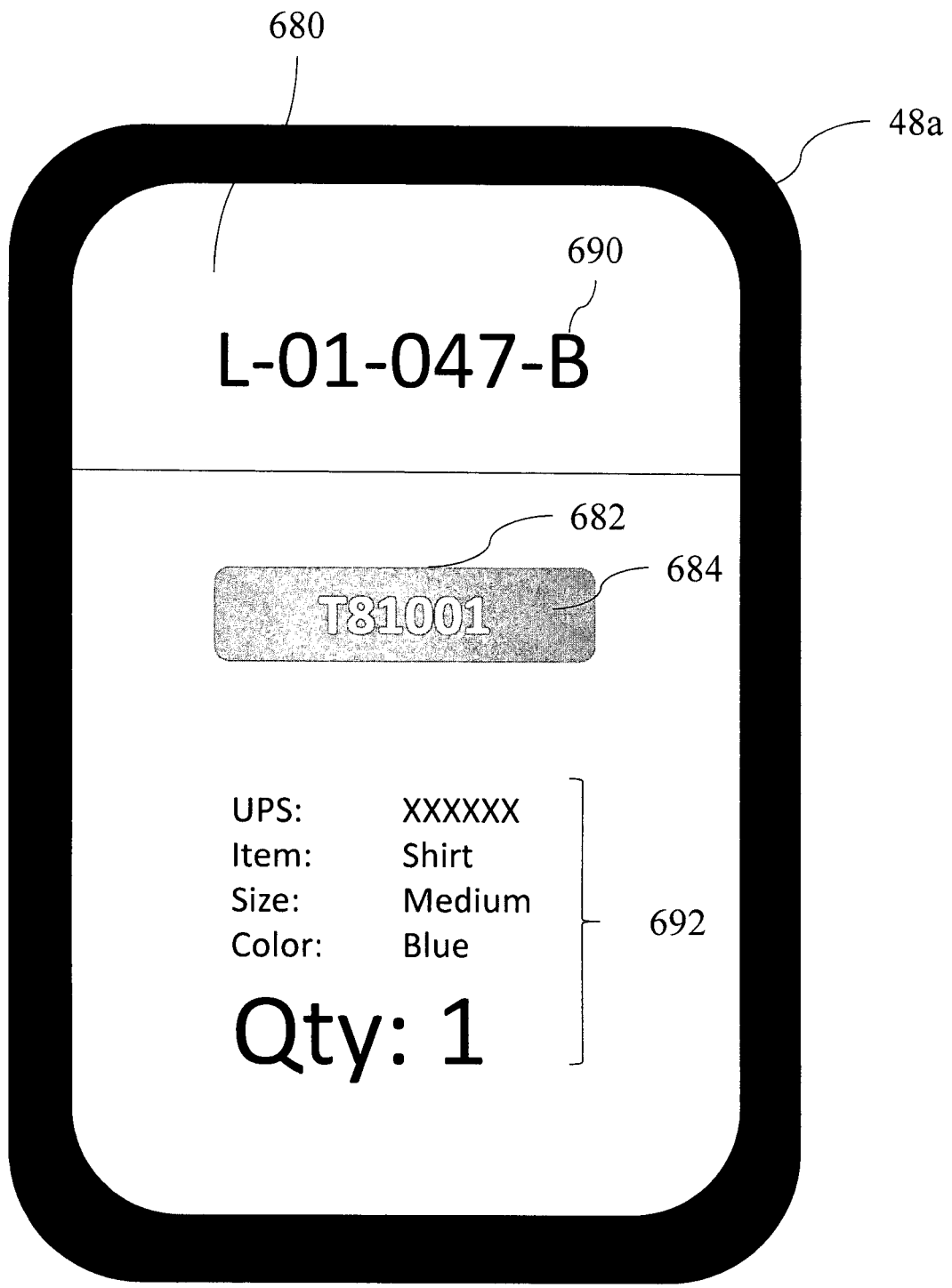
FIG. 13 is a view of the display of the tablet of the robot shown in FIGS. 9A and 10.

Once at a location, such as the location shown in FIG. 10, the robot 18a may communicate the pick task to operator 50a via tablet 48a. As depicted in FIG. 13, the display 680 of tablet 48a shows the container number "T81001" at location 682, which corresponds to container 602 of storage array 44a. This tells the operator that the item to be picked needs to be placed in this container. In addition, although not visible in this black and white drawing, the color of area 684 surrounding the container number corresponds to the color of the container to make it even easier for operator 50 to know where the item is to be placed. In this example, region 684 is colored blue to indicate that container 602 ("T8001") is also colored blue.

At location 690 on display 680, the bin location, in this case "L-01-047-B", which corresponds to bin location 630 in FIG. 10 proximate robot 18a is displayed for operator 50a to read. Also on display 680 is the item, in this case a "shirt", size "medium", color "blue" and quantity "1". The UPC code may also be provided for the operator to verify an exact item match. From this information, the operator can readily locate the item in the identified bin location and place it in the proper container in the storage array 44a.

Alternatively, instead of executing a series of "pick" orders assigned to each of the containers in the storage array, the storage array may be loaded with items by the operator when the order includes "place" tasks for each of the containers. When an operator scans a barcode of an item storage array at step 652, FIG. 11, the identification is transmitted to order server 14, which then obtains one or more characteristics of the particular storage array to assign the order(s). However, in this case the orders generated are for items to be placed, which the order server 14 retrieves from a "place" queue and assigns them to the individual containers in the same manner as described above based on one or more characteristics of the storage array. This order information is provided to the operator via the tablet display and the operator loads the containers according to the orders generated. The place orders are executed in a manner corresponding to the pick orders described above.

With the above described storage array, having interconnected containers forming an integrated array, not only makes the induction and order assignment process more efficient and streamlined it also makes correcting operator errors easier and more straightforward. A common error that can occur is placing an item in the wrong container. With multiple individual containers, as opposed to interconnected/integrated storage arrays, an item placed in an incorrect container becomes more difficult to reconnect to the correct container as the containers move throughout the process and become separated. With the storage array according to this invention, the interconnected containers stay together throughout the process making it easier to correct errors among the interconnected containers.

Having described the invention, and a preferred embodiment thereof, what is claimed as new and secured by Letters Patent is:

1. A method for executing orders by at least one robot on a plurality of items stored at locations throughout a warehouse, the method comprising:
   receiving, at an order server, information corresponding to a barcode affixed to an item storage array disposed on said at least one robot; the item storage array including a plurality of interconnected containers each for storing items associated with an order;
   retrieving, by the order server in response to receiving the barcode information, data describing at least one characteristic of the item storage array;
   transmitting, from the order server to the at least one robot, an order assignment for association with each of the plurality of containers of the item storage array, the order assignments being selected based in part on the at least one characteristic of the item storage array; and
   navigating the at least one robot, by a processor of the at least one robot, in response to receipt of one or more of the order assignments at the at least one robot, to locations throughout the warehouse to execute the order assignments associated with each of the plurality of containers of the item storage array.

2. The method of claim 1 wherein the barcode of the item storage array is associated with the item storage array per se rather than the individual containers and wherein the item storage array further includes a barcode associated with each of the individual containers in the item storage array.

3. The method of claim 1 wherein the item storage array is disposed on a surface of the at least one robot.

4. The method of claim 1 wherein the item storage array is attached to an armature affixed to the at least one robot and the item storage array is located above a surface of the at least one robot.

5. The method of claim 1 wherein the step of retrieving the data describing the at least one characteristic of the item storage array includes correlating the barcode information to an item storage array identification stored in a table of the order server and obtaining data describing a plurality of characteristics of the identified item storage array.

6. The method of claim 5 wherein the plurality of characteristics of the item storage array includes one or more of a number of containers, container identification numbers, colors of the containers, and dimensions of the containers.

7. The method of claim 6 wherein the step of navigating includes displaying, by the at least one robot, at least one of the container identification number and the container color to inform an operator which container in the item storage array is associated with the execution of each order assignment.

8. The method of claim 6, further comprising selecting, from an order queue in communication with the order server, a number of orders corresponding to the number of containers in the item storage array and assigning each of the containers of the item storage array an order assignment from the number of orders.

9. The method of claim 8 wherein the step of assigning each of the obtained orders to a container further includes selecting the container to be associated with each order assignment at least partially based on an additional characteristic of the item storage array.

10. The method of claim 8 wherein the additional characteristic includes a dimension of each of the containers.

11. A robot for executing orders on a plurality of items stored at locations throughout a warehouse, the robot comprising:
   a mobile base;
   an item storage array disposed on the mobile base and including a plurality of interconnected containers each for storing items associated with an order, the item storage array including a barcode which is correlated to data stored in an order server the data describing at least one characteristic of the item storage array;
   a transceiver for receiving, at the robot, an order assignment from the order server associated with each of the plurality of containers of the item storage array, the order assignments being based in part on the at least one characteristic of the item storage array; and
   a processor configured to, in response to receipt of the order assignments by the transceiver, navigate the robot to locations throughout the warehouse to execute the order assignments associated with each of the plurality of containers of the item storage array.

12. The robot of claim 11 wherein the barcode of the item storage array is associated with the item storage array per se rather than the individual containers and wherein the item storage array further includes a barcode associated with each of the individual containers in the item storage array.

13. The robot of claim 11 wherein the item storage array is disposed on a surface of the at least one robot.

14. The robot of claim 11 wherein the item storage array is attached to an armature affixed to the at least one robot and the item storage array is located above a surface of the at least one robot.

15. The robot of claim 11 wherein the barcode is correlated to an item storage array identification stored in a table in the order server, the order server configured to obtain data describing a plurality of characteristics of the identified item storage array.

16. The robot of claim 15 wherein the plurality of characteristics of the item storage array includes one or more of a number of containers, container identification numbers, colors of the containers, and dimensions of the containers.

17. The robot of claim 16 wherein the robot further includes a display and the processor is further configured to provide an image on the display indicating at least one of the container identification number and the container color to inform an operator which container in the item storage array is associated with the execution of each order assignment.

18. The robot of claim 16 wherein the number of containers in the item storage array is used to select, from an order queue in communication with the order server, a number of orders corresponding to the number of containers in the item storage array for assigning an order to each of the containers of the item storage array from the number of orders.

19. The robot of claim 18 wherein assigning each of the obtained orders to a container further includes selecting the container to be associated with each order assignment at least partially based on an additional characteristic of the item storage array.

20. The robot of claim 19 wherein the additional characteristic includes a dimension of each of the containers.

* * * * *

UNITED STATES PATENT AND TRADEMARK OFFICE
CERTIFICATE OF CORRECTION

PATENT NO. : 10,001,768 B2
APPLICATION NO. : 15/254321
DATED : June 19, 2018
INVENTOR(S) : Michael Charles Johnson et al.

It is certified that error appears in the above-identified patent and that said Letters Patent is hereby corrected as shown below:

In the Claims

Column 10, Line 16-Column 12, Lines 1-35, should read:
1. A method for executing orders by at least one robot on a plurality of items stored at locations throughout a warehouse, the method comprising:
    receiving, at an order server, information corresponding to a barcode affixed to an item storage array disposed on said at least one robot; the item storage array including a plurality of interconnected containers each for storing items associated with an order;
    retrieving, by the order server in response to receiving the barcode information, data describing at least one characteristic of the item storage array;
    transmitting, from the order server to the at least one robot, an order assignment for association with each of the plurality of containers of the item storage array, the order assignments being selected based in part on the at least one characteristic of the item storage array; and
    navigating the at least one robot, by a processor of the at least one robot, in response to receipt of one or more of the order assignments at the at least one robot, to locations throughout the warehouse to execute the order assignments associated with each of the plurality of containers of the item storage array.

2. The method of claim 1 wherein the barcode of the item storage array is associated with the item storage array per se rather than the individual containers and wherein the item storage array further includes a barcode associated with each of the individual containers in the item storage array.

3. The method of claim 1 wherein the item storage array is disposed on a surface of the at least one robot.

4. The method of claim 1 wherein the item storage array is attached to an armature affixed to the at least one robot and the item storage array is located above a surface of the at least one robot.

Signed and Sealed this
Third Day of December, 2019

Andrei Iancu
*Director of the United States Patent and Trademark Office*

CERTIFICATE OF CORRECTION (continued)
U.S. Pat. No. 10,001,768 B2

5. The method of claim 1 wherein the step of retrieving the data describing the at least one characteristic of the item storage array includes correlating the barcode information to an item storage array identification stored in a table of the order server and obtaining data describing a plurality of characteristics of the identified item storage array.

6. The method of claim 5 wherein the plurality of characteristics of the item storage array includes one or more of a number of containers, container identification numbers, colors of the containers, and dimensions of the containers.

7. The method of claim 6, further comprising selecting, from an order queue in communication with the order server, a number of orders corresponding to the number of containers in the item storage array and assigning each of the containers of the item storage array an order assignment from the number of orders.

8. The method of claim 7 wherein the step of assigning each of the obtained orders to a container further includes selecting the container to be associated with each order assignment at least partially based on an additional characteristic of the item storage array.

9. The method of claim 7 wherein the additional characteristic includes a dimension of each of the containers.

10. The method of claim 6 wherein the step of navigating includes displaying, by the at least one robot, at least one of the container identification number and the container color to inform an operator which container in the item storage array is associated with the execution of each order assignment.

11. A robot for executing orders on a plurality of items stored at locations throughout a warehouse, the robot comprising:
    a mobile base;
    an item storage array disposed on the mobile base and including a plurality of interconnected containers each for storing items associated with an order, the item storage array including a barcode which is correlated to data stored in an order server the data describing at least one characteristic of the item storage array;
    a transceiver for receiving, at the robot, an order assignment from the order server associated with each of the plurality of containers of the item storage array, the order assignments being based in part on the at least one characteristic of the item storage array; and
    a processor configured to, in response to receipt of the order assignments by the transceiver, navigate the robot to locations throughout the warehouse to execute the order assignments associated with each of the plurality of containers of the item storage array.

12. The robot of claim 11 wherein the barcode of the item storage array is associated with the item storage array per se rather than the individual containers and wherein the item storage array further includes a barcode associated with each of the individual containers in the item storage array.

13. The robot of claim 11 wherein the item storage array is disposed on a surface of the at least one robot.

14. The robot of claim 11 wherein the item storage array is attached to an armature affixed to the at least one robot and the item storage array is located above a surface of the at least one robot.

15. The robot of claim 11 wherein the barcode is correlated to an item storage array identification stored in a table in the order server, the order server configured to obtain data describing a plurality of characteristics of the identified item storage array.

16. The robot of claim 15 wherein the plurality of characteristics of the item storage array includes one or more of a number of containers, container identification numbers, colors of the containers, and dimensions of the containers.

17. The robot of claim 16 wherein the number of containers in the item storage array is used to select, from an order queue in communication with the order server, a number of orders corresponding to the number of containers in the item storage array for assigning an order to each of the containers of the item storage array from the number of orders.

18. The robot of claim 17 wherein assigning each of the obtained orders to a container further includes selecting the container to be associated with each order assignment at least partially based on an additional characteristic of the item storage array.

19. The robot of claim 18 wherein the additional characteristic includes a dimension of each of the containers.

20. The robot of claim 16 wherein the robot further includes a display and the processor is further configured to provide an image on the display indicating at least one of the container identification number and the container color to inform an operator which container in the item storage array is associated with the execution of each order assignment.